US012123894B2

United States Patent
Rival et al.

(10) Patent No.: US 12,123,894 B2
(45) Date of Patent: Oct. 22, 2024

(54) APPARATUS AND METHOD FOR MEASURING VELOCITY PERTURBATIONS IN A FLUID

(71) Applicant: Queen's University at Kingston, Kingston (CA)

(72) Inventors: David E. Rival, Ottawa (CA); Joshua N. Galler, Thornhill (CA)

(73) Assignee: Queen's University at Kingston, Kingston (CA)

( * ) Notice: Subject to any disclaimer, the term of this patent is extended or adjusted under 35 U.S.C. 154(b) by 737 days.

(21) Appl. No.: 16/864,698

(22) Filed: May 1, 2020

(65) Prior Publication Data

US 2020/0348329 A1 Nov. 5, 2020

Related U.S. Application Data

(60) Provisional application No. 62/841,569, filed on May 1, 2019.

(51) Int. Cl.
*G01P 5/00* (2006.01)
*G01D 21/02* (2006.01)
*G01S 19/47* (2010.01)
*G01S 19/52* (2010.01)

(52) U.S. Cl.
CPC ............. *G01P 5/001* (2013.01); *G01D 21/02* (2013.01); *G01S 19/47* (2013.01); *G01S 19/52* (2013.01)

(58) Field of Classification Search
CPC ................................. G01S 19/47; G01S 19/52
USPC ... 342/357.3, 347.27, 347.44, 368, 374, 173
See application file for complete search history.

(56) References Cited

U.S. PATENT DOCUMENTS

| | | | |
|---|---|---|---|
| 6,796,168 B1 * | 9/2004 | Goldstein | G01N 11/04 73/54.04 |
| 2015/0291178 A1 | 10/2015 | You et al. | |
| 2016/0299234 A1 | 10/2016 | Zeng et al. | |
| 2017/0045144 A1 * | 2/2017 | Khaira | F16J 15/3492 |
| 2017/0253330 A1 * | 9/2017 | Saigh | G08G 5/0069 |
| 2017/0336808 A1 | 11/2017 | Luo | |

FOREIGN PATENT DOCUMENTS

WO   WO2014/025661 A1   2/2014

OTHER PUBLICATIONS

Krauchi, A., et al., "Controlled weather ballon ascents and descents for atmospheric research and climate monitoring", Atmos. Meas. Tech., vol. 9, pp. 929-938, (2016).

(Continued)

*Primary Examiner* — Bo Fan
(74) *Attorney, Agent, or Firm* — Stephen J. Scribner

(57) ABSTRACT

Apparatus and methods for measuring velocity perturbation in a fluid include one or more sensor vehicle adapted to be deployed in the fluid and a device that obtains position and acceleration data of each sensor vehicle. A physical model of the one or more sensor vehicle behaviour is used to transform the obtained data into a velocity field of the fluid, and output a map of the velocity field in the fluid. Sensor vehicles may be adapted to move passively through the fluid and/or to be transported by the fluid. The apparatus and methods may be used in liquid and gaseous environments, and the velocity field map may be used to track movement of species and particulate matter of interest in the fluid in real time.

23 Claims, 12 Drawing Sheets

(56) References Cited

OTHER PUBLICATIONS

Lindstrom, E.J., et al., "Autonomous Multi-platform Observations During the Salinity Processes in the Upper-ocean Regional Study", Oceanography, vol. 30, No. 2, pp. 38-48, (2017).

Zussman, E., et al., "A micro-aerodynamic decelerator based on permeable surfaces of nanofiber mats", Experiments in Fluid, vol. 33, pp. 315-320, (2002).

Mariton, G.J. et al., "Note: A balloon-borne accelerometer technique for measuring atmospheric turbulence", Review of Scientific Instruments, 86, pp. 016109-016109-3, (2015).

Kumar, A., et al., "An Inertial Sensor to Measure Wind Turbulence with RC Helicopters", Proceedings of the ASME 2017 Dynamic Systems and Control Conference, (2017).

Elston, J. et al., "Overview of Small Fixed-Wing Unmanned Aircraft for Meteorological Sampling", American Meteorological Society, vol. 32, pp. 97-115, (2015).

Kilcher, L.F, et al., "Turbulence Measurements from Compliant Moorings—Part II: Motion Correction", ResearchGate, pp. 1-49, (2017).

Witte, B.M., et al., "Development of an Unmanned Aerial Vehicle for the Measurement of Turbulence in the Atmospheric Boundary Layer", Atmosphere, 8, pp. 1-25, (2017).

Riddell, Kevin D.A., "Design, Testing and Demonstration of a Small Unmanned Aircraft System (SUAS) and Payload for Measuring Wind Speed and Particulate Matter in the Atmospheric Boundary Layer", Thesis, pp. 1-88, (2010).

Thomson, J. et al., "Turbulence measurements from moving platforms", IEEE/OES Current, Waves, and Turbulence Measurement Workshop, pp. 1-5, (2015).

Casassa, L.P. et al., "A low-cost UAS for monitoring vertical wind distribtuion First International Symposium on Geoscience and remote sensing", pp. 1-4, (2017).

Emran, B.J. et al., "Low-Altitude Aerial Methane Concentration Mapping", Remote Sens , vol. 9, No. 823, pp. 1-13, (2017).

McCoy, H. "UCalgary launches Centre for Smart Emissions Sensing Technologies", UofCalgary News, (2018).

* cited by examiner

APPARATUS AND METHOD FOR MEASURING VELOCITY PERTURBATIONS IN A FLUID

RELATED APPLICATION

This application claims the benefit of the filing date of U.S. Application No. 62/841,569, filed on May 1, 2019, the contents of which are incorporated herein by reference.

FIELD

This invention relates to apparatus and methods for measuring velocity perturbations in a fluid medium. Applications may include deployment for tracking and prediction of the spread of toxic chemicals, radiation, and other particulate and flow field measurement for wind-farm siting or meteorological analysis.

BACKGROUND

The dispersal of various species or particulate matter in a fluid such as air or water is governed by mixing through eddies—often turbulent in nature—in the air or water. Naturally occurring phenomena, industrial accidents, and warfare may result in the release of species and particulate matter such as chemical, biological, radiological, and nuclear agents into the atmosphere and/or large bodies of water, which may present a serious threat to the environment and local communities. Real-time and instantaneous flow data collected over a large spatial domain is necessary to predict the exact dispersal of such threats. Current data acquisition techniques that rely on sensors deployed on weather balloons, wind masts, and ocean drifters only provide slow responses due to their large inertia, and consequently flow predictions suffer from large bias errors that accumulate in time. As a result, measured velocities are akin to a time-averaged signal, only useful when mean fluid properties rather than velocity perturbations are desired.

Large-scale particle tracking velocimetry (LSPTV) and large-scale particle image velocimetry (LSPIV) have been used to experimentally characterize the atmospheric boundary layer using unconventional tracers including soap bubbles and natural snowfall. While these results prove that heavier-than-air tracers can be used for optical velocity measurements, obtaining accurate data in unsteady or turbulent scales remains a challenge. The inertia of large tracer particles results in a significant time-lag in velocity response, rendering such tracers of limited use for measurement of transient phenomena, such as turbulent scales.

SUMMARY

One aspect of the invention relates to apparatus for measuring position, acceleration, and rotation of an object moving in a fluid. Another aspect of the invention relates to apparatus for calculating the local and instantaneous velocity of the fluid in which the apparatus is immersed. Embodiments include features that allow for velocity measurements in complex unsteady fluid environments, and thus overcome obstacles which have prevented data collection for the development of a robust velocity measurement system for such conditions.

Embodiments include an in-air velocity sensor that is configured for passive or active flight involving a passive measurement phase where the object is allowed to move freely with the surrounding fluid. Such embodiments allow velocity measurement to be directly tied to the mechanics of the fluid eddies responsible for mixing processes. Embodiments for chemical dispersal provide data that allows for the reconstruction of the flow field in the affected zone, and provide information that can predict the spread of the chemical in real-time. Embodiments have the capability to provide users with data that reflects the live conditions of the theatre of operations and provide higher quality intelligence, such that relief and containment efforts are cost effective and prioritize those at highest risk.

Embodiments may be configured for other applications where a flow field in other liquids or in gaseous media such as air is required. For example, embodiments may measure velocities in any location of interest, which may be coupled with existing fluid simulation techniques to provide more meaningful predictions, allowing the user to perform more detailed analysis and produce more accurate simulations of real-world fluid phenomena including weather, pollutant dispersion, ocean currents, etc.

In one embodiment, an apparatus for measuring velocity perturbation in a fluid comprises one or more sensor vehicle adapted to be deployed in the fluid; a device that obtains data comprising at least one of position and acceleration of the one or more sensor vehicle; and a processor that applies a physical model of the one or more sensor vehicle behaviour to transform the obtained data into a velocity field of the fluid, and outputs a map of the velocity field in the fluid.

In one embodiment, each of the one or more sensor vehicles is an active sensor vehicle comprising an inertial measurement unit (IMU) and a global positioning system (GPS) unit; the device that obtains data includes a receiver that receives IMU data and GPS data from each of the one or more sensor vehicles; and the processor applies the physical model of the one or more sensor vehicle to transform the received IMU and GPS data into the velocity field of the fluid.

In one embodiment, each of the one or more sensor vehicles is a passive sensor vehicle; the device that obtains data includes a camera that obtains image data of the one or more sensor vehicles; and the processor determines position, velocity, and acceleration of the one or more sensor vehicles from the image data and applies the physical model of the one or more sensor vehicle to transform the image data into a velocity field of the fluid.

In one embodiment, an apparatus for measuring velocity perturbations in a fluid comprises one or more sensor vehicle adapted to be deployed in the fluid; a device that obtains data comprising position and acceleration of each sensor vehicle; and a processor that applies a physical model of the one or more sensor vehicle behaviour to transform the obtained data into a velocity field of the surrounding fluid, and outputs a fluid velocity field.

In one embodiment, each of the one or more sensor vehicles includes an IMU and a GPS; the device that obtains data includes a receiver that receives IMU data and GPS data from each of the one or more sensor vehicles; and the processor applies the physical model of the one or more sensor vehicle to transform the received IMU and GPS data into a velocity field of the fluid.

In one embodiment, the one or more sensor vehicles are optically tracked, using one or more cameras and a processor to obtain position and velocity information of each sensor vehicle. The processor applies the physical model of the one or more sensor vehicles to transform the obtained data into a velocity field of the surrounding fluid, and outputs a fluid velocity field.

In one embodiment, the one or more sensor vehicles are adapted to move passively with the fluid (i.e., to be transported by the surrounding fluid itself).

In one embodiment, the velocity field provides an indication of movement of species and/or particulate matter of interest in the fluid in real time. The species/particulate matter may comprise a chemical compound.

Another aspect of the invention relates to a method for measuring velocity perturbations in a fluid, comprising: deploying one or more sensor vehicle in the fluid; obtaining data comprising position and acceleration of each sensor vehicle; and using a processor to apply a physical model of the one or more sensor vehicle behaviour to transform the obtained data into a velocity field of the fluid; and outputting a fluid velocity field.

In one embodiment, the method may include obtaining IMU data and GPS data from each of the one or more sensor vehicles; and transforming the received IMU and GPS data into a fluid velocity field.

In one embodiment the method comprises deploying one or more sensor vehicle in the fluid; obtaining data comprising at least one of position and acceleration of the one or more sensor vehicle; using a processor to apply a physical model of the one or more sensor vehicle behaviour to transform the obtained data into a velocity field of the fluid; and outputting a velocity field map of the fluid.

In one embodiment the method comprises deploying one or more active sensor vehicle comprising inertial measurement unit (IMU) and a global positioning system (GPS) unit; obtaining IMU data and GPS data from each of the one or more sensor vehicles; wherein the processor applies the physical model of the one or more sensor vehicle to transform the IMU and GPS data into a velocity field of the fluid.

In one embodiment the method comprises deploying one or more passive sensor vehicle; using a camera to obtain image data of the one or more sensor vehicles; wherein the processor determines position, velocity, and acceleration of the one or more sensor vehicles from the image data and applies the physical model of the one or more sensor vehicle to transform the image data into a velocity field of the fluid.

The method may include generating the velocity field to provide an indication of movement of species and/or particulate matter of interest in the fluid in real time, wherein the species/particulate matter may comprise a chemical compound.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1A:
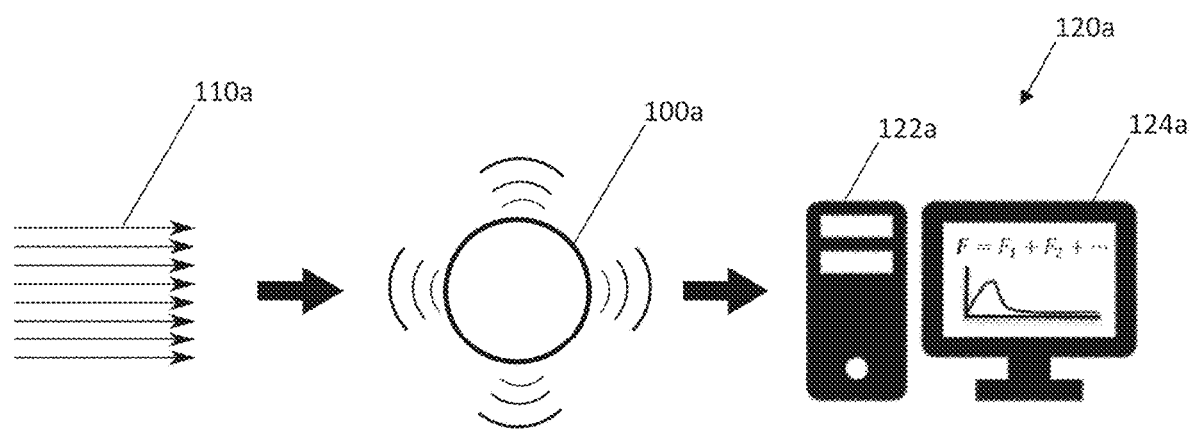
FIGS. 1A and 1B are diagrams showing systems having one sensor vehicle, according to embodiments.

Force generated by a body immersed in a fluid exposed to a perturbation such as a rapid flow acceleration, or gust, is generally characterized by a sharp increase in fluid forces before relaxing back to a steady state. Such acceleratory motions are ubiquitous in wind, where the flow is characterized by turbulent fluctuations and gusts. Measuring turbulent events is difficult outside of a laboratory setting, due to the limitations of conventional sensors which, as described above, only provide unresponsive point-data due to their relatively heavy and large embodiments.

According to one aspect of the invention, physical modelling techniques are provided that accurately capture small-scale acceleratory events in a fluid. Embodiments described herein may be used to overcome the difficulty encountered with prior techniques associated with in-situ turbulence measurements. Embodiments based upon a combination of measurements and physical modelling offer significantly lower computational costs, and allow for real-time measurements and sensor feedback. Embodiments may employ Lagrangian (i.e., flow-following) methods for turbulence measurements over large domains.

According to another aspect of the invention, apparatus is provided including sensor platforms that respond to real turbulent scales, and thereby are able to follow a path taken by a particle in a turbulent flow, or the path of the turbulent flow. Sensor platform embodiments may include one or more active or passive sensor vehicles, and include sensor data acquisition components adapted to acquire data from active or passive sensor vehicles. Some embodiments include a plurality of sensor vehicles that may be deployed as a "swarm" in a region of interest (e.g., an atmospheric or aquatic/oceanic environment). By exploiting sensor vehicle behaviour in which sensor vehicles respond to real turbulent scales, the sensor vehicles thus provide data corresponding to actual fluid mixing, flow, and dispersal phenomena. By employing sensors that operate in a Lagrangian frame, embodiments provide superior spatial resolution, and improved efficiency in data acquisition over prior approaches based on large measurement domains. To accurately determine flow conditions from inertial measurements, embodiments may be based on a system that employs low-order force modelling to determine flow velocity.

As used herein, the term "turbulence" or "turbulent flow" refers to fluid motion characterized by perturbations in pressure and flow velocity, resulting in, for example, enhanced fluid mixing. Turbulence or turbulent flow may also be described by the presence of coherent structures within the flow, that are responsible for transport of momentum, energy, and/or other scalar quantities.

Embodiments which may be used for applications such as measurement of atmospheric or aquatic/ocean currents include a plurality of sensor vehicles that are dispersed over a measurement domain in the atmosphere or in water. Some embodiments use active sensor vehicles wherein each sensor vehicle includes at least one active (e.g., powered or energized) on-board instrument that senses one or more parameter of the sensor vehicle behaviour in the measurement domain, and/or of the local fluid motion in which it is immersed or dispersed. For example, an on-board instrument may be an inertial measurement unit (IMU), a global positioning system (GPS) unit, etc. The sensed parameters are used to compute fluid velocity and acceleration along sensor path lines, which are tracked via a suitable technology such as the GPS. In one example, the acquired sensor data may be used to generate an accurate flow map based on each location of the plurality of sensor vehicles. This may be fed into existing large-scale models (e.g., models obtained using conventional methods) for improved accuracy.

Other embodiments use one or more passive sensor vehicles, wherein each passive sensor vehicle does not include any active on-board instrument. A plurality of passive sensor vehicles may be deployed in a region of interest and tracked using one or more cameras or other suitable device to obtain sensor data. Embodiments may use optical tracking at visible or non-visible (e.g., infra-red (IR)) wavelengths. Use of wavelengths such as IR may advantageously allow for data to be obtained from passive sensor vehicles at night or in low-light or low-visibility conditions. In one embodiment sensor data is acquired as camera images which can then be processed to obtain position, velocity, and acceleration data of each sensor vehicle. Further processing of the data using a physical model may be performed to obtain a corrected flow map.

Optionally, sensor vehicles may be equipped with other instruments such as sensors for detecting substances, such as, for example, gases, pollutants, salinity, etc., and the data used to correlate substance concentration with the flow regime and behaviour. Thus, the dispersal, concentration, etc., of such substances may be tracked and/or predicted in an atmospheric or aquatic/oceanic environment.

According to one embodiment, a plurality of active sensor vehicles equipped with suitable sensors may be deployed in a hazardous region for measuring and tracking harmful substance dispersal. The sensor vehicle swarm is dispersed into the measurement domain prior to measurement. Whereas any number of sensor vehicles may be deployed, and greater numbers may enhance tracking flow and predicting dispersal, the number of sensor vehicles deployed may depend on one or more of the specific application, the cost, and the data acquisition and processing capabilities of the system.

For atmospheric applications, the dispersal of sensor vehicles may be achieved any of a number of ways. For example, a ground-based launcher may send the sensor vehicles up to the desired altitude, or the sensor vehicles may have active flight capabilities to reach the measurement domain from a base station, or the sensor vehicles may be released from an aircraft or drone. For water-borne applications, the dispersal may be achieved, e.g., from a boat, an aircraft, or drone. Once within the measurement domain, the sensor vehicles move passively throughout the flow and the on-board sensors track their motion in time. The data collected can then be processed to determine an output such as a fluid velocity field, velocity map, etc. The velocity map produced by the sensors, potentially coupled with in-situ measurements of harmful substance concentration, can be used to track and predict species and particulate dispersal. Thus, such Lagrangian measurements allow for acquisition of data at a scale relevant to fluid mixing, allowing for accurate predictions of species and particulate dispersal. Such an embodiment may optionally use real-time sensor data transmission for near instantaneous feedback, as may be desired in emergency situations such as an industrial disaster where immediate action must be taken.

According to another embodiment, a plurality of passive sensor vehicles may be dispersed into a measurement domain prior to measurement. For atmospheric applications, the dispersal may be achieved any of a number of ways. For example, a ground-based launcher may send the sensor vehicles up to the desired altitude, or the sensor vehicles may be released from an aircraft or drone. For water-borne applications, the dispersal may be achieved, e.g., from a boat, an aircraft, or drone. Once within the measurement domain, the sensor vehicles move passively throughout the flow, and their movement is detected and tracked using optical tracking. For example, the plurality of sensor vehicles may be tracked using one or more cameras. The sensor data (i.e., camera images) collected may then be processed to obtain position and velocity data of each sensor vehicle. Further processing of the data using a physical model may be performed to determine and output a fluid velocity field, a velocity map, etc. Such outputs may be used to track and predict species and particulate dispersal in the fluid environment, to track and predict weather, etc. Use of such Lagrangian measurements allows for acquisition of data at a scale relevant to fluid mixing, enabling accurate predictions of, e.g., species and particulate dispersal. Further, by capturing sensor data in real time, a velocity map may be generated substantially instantaneously, as may be desired in emergency situations (e.g., an industrial disaster where a dangerous substance is released) where immediate action must be taken.

Thus, a system as described herein, which may include one or more sensor vehicle, may be used in diverse applications in gaseous or liquid environments, for obtaining data relating to dispersal of particulate matter, chemical compounds, etc., in such environments, and for predicting dispersal of such particulate matter in such environments. Further applications, such as monitoring and predicting weather, are also contemplated.

According to some embodiments, an active sensor vehicle may include sensors for measuring acceleration and orientation of the sensor vehicle. In one embodiment, the sensors are implemented with a 3-axis accelerometer, a 3-axis gyroscope, and a 3-axis magnetometer. These sensors may be located substantially at the vehicle's centre of gravity, for accurate determination of the sensor vehicle's orientation. A sensor vehicle may also include a radio transmitter for transmitting the sensor data to a base station. The accelerometer, gyroscope, and magnetometer may be implemented with an inertial measurement unit (IMU). The sensor vehicle may also include a GPS device, coupled with the IMU data, for accurate dead-reckoning (i.e., determining the sensor vehicle geographic position).

FIG. 1A shows a basic system according to embodiments described herein. As shown in FIG. 1, the system includes one or more active sensor vehicle 100a equipped with a radio transmitter and a base station 120a including a radio receiver 122a and a processor 124a. The sensor vehicle is small and light-weight, and has sensors that measure acceleration from a wind gust 110a acting upon it. The sensor vehicle transmits sensor data to the base-station 120a for processing. The system may include a sensor vehicle calibration for the flow in which it is deployed. For example, a calibration for neutrally buoyant vehicles for water-borne applications or lightweight and high drag vehicles for atmospheric applications.

Figure 1B:
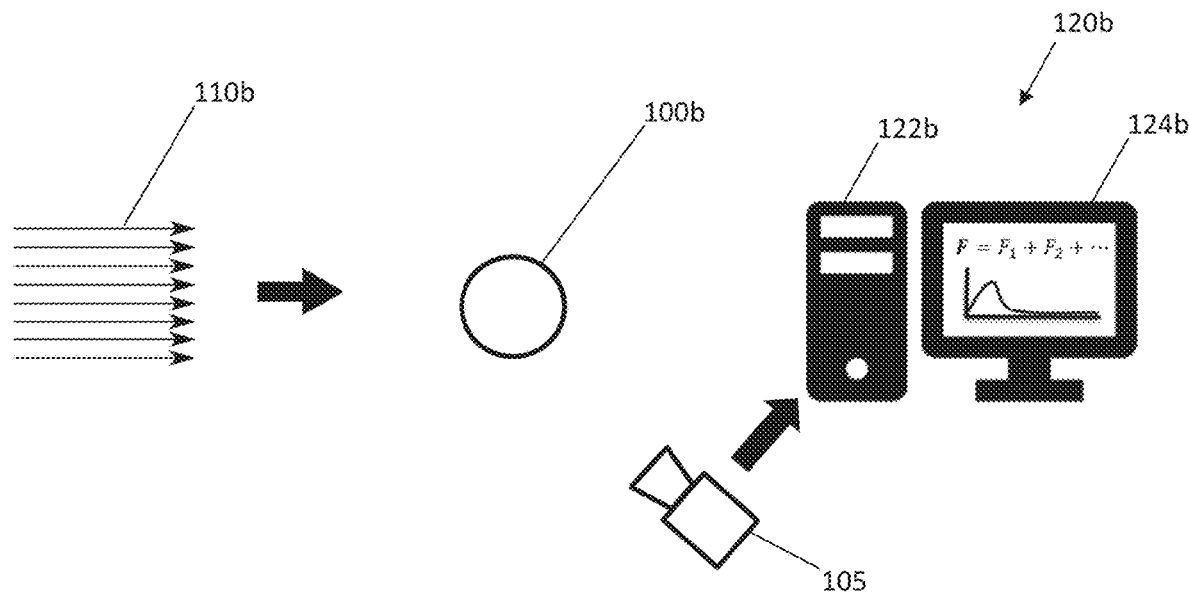

FIG. 1B shows a basic system according to other embodiments described herein. As shown in FIG. 1B, the system includes one or more passive sensor vehicle 100b, at least one camera 105, and a base station 120b including an optional receiver 122b and a processor 124b. Relative to the embodiment of FIG. 1A, the passive sensor vehicle 100b may be smaller and is very light-weight, such that it may be adapted to move passively through the fluid and/or to be transported by the fluid, e.g., carried by a wind gust 110b acting upon it. At least one camera 105 captures images of the sensor vehicle(s) 100b and relays or transmits the images, i.e., sensor data, to the base-station 120b for processing. The system may include a sensor vehicle calibration for the flow in which it is deployed. For example, a calibration for neutrally buoyant sensor vehicles for water-borne applications or for lightweight and high drag vehicles for atmospheric applications.

In one embodiment, the base station comprises a radio receiver that receives sensor data signals from one or more active sensor vehicles. The radio receiver is connected to a processor, such as a laptop computer, with a suitable connection such as a universal serial bus (USB). Alternatively, the base station may be configured with a radio receiver and dedicated processor, central processing unit (CPU), storage device, etc., so that a separate computing device is not required. In another embodiment, the base station receives image data for one or more passive sensor vehicles from one or more cameras. The base station, together with the processor, receives real-time sensor vehicle data and stores the data for post-processing, or performs substantially live processing so that information about the flow field is instantly available. The data recorded and processed may include one or more of x-axis, y-axis, and z-axis accelerations, angular accelerations, magnetic field strength, etc.

Figure 2:
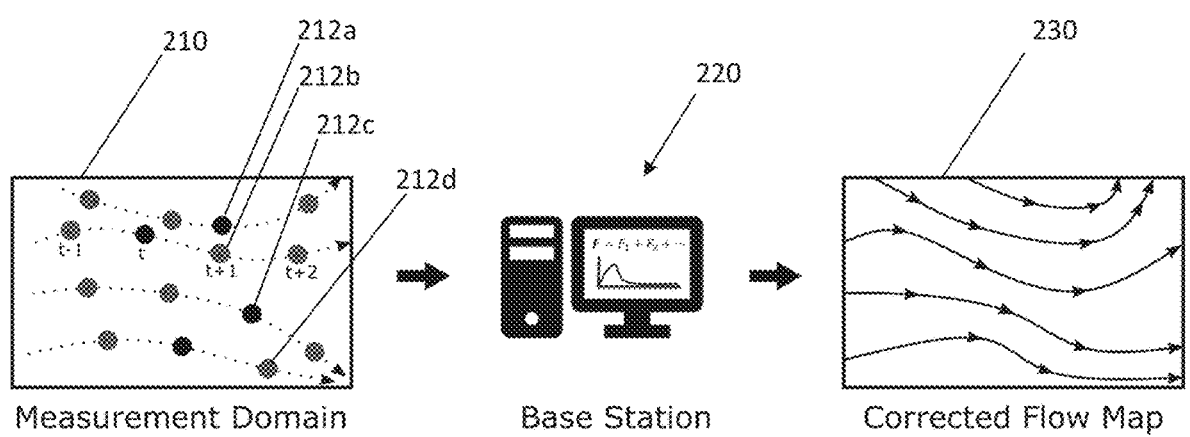
FIG. 2 is a diagram showing a system with multiple sensor vehicles, and an output comprising a corrected flow map produced by applying a wind-correction algorithm to the sensor vehicle data, according to one embodiment.

FIG. 2 shows a representation of an implementation of a system according to embodiments described herein. As shown in FIG. 2, multiple sensor vehicles are dispersed throughout a measurement domain 210. In this example, there are four sensor vehicles 212a, 212b, 212c, 212d. At each timestep t−1, t, t+1, t+2, parameters (i.e., data) for each sensor vehicle, such as position, velocity, acceleration, and/or other parameters of interest are recorded and transmitted to the base station 220 where processing occurs. The time steps may be synchronized or different for all or subsets of the sensor vehicles. A corrected flow map 230 is produced, which may comprise true wind-vectors, for example. This is shown in FIG. 2 where it can be seen that streamlines in the corrected flow map 230 are different from path lines of the sensor vehicles in 210, due to non-ideal sensor vehicle response. In some embodiments the sensor vehicle path lines are not directly transformed into the fluid streamlines. The streamlines depend upon the resulting vector field after a correction algorithm is applied. Thus, applying a correction algorithm to the data, as described herein, allows for a more accurate flow measurement.

Figure 3A:
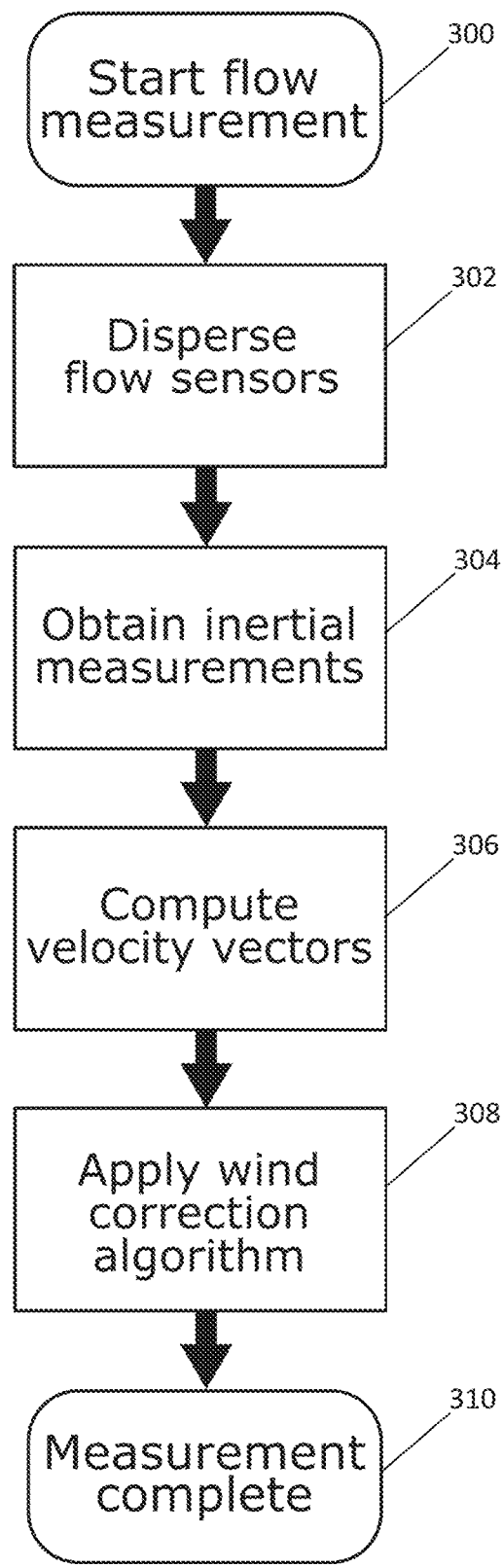
FIG. 3A is a flowchart overview of a flow-sensing process, from start to completion of a measurement, according to a generalized embodiment based on an active sensor vehicle.

Processing active sensor vehicle data may include the processor executing one or more algorithms, such as an orientation algorithm to determine sensor vehicle orientation, optionally wherein measurements are oriented to a ground-fixed coordinate system. FIG. 3A is a flowchart showing processing steps carried out by the processor, according to a generalized embodiment. Upon dispersing one or more sensor vehicles 302, sensor data relating to inertial measurements are obtained 304 from the accelerometer, gyroscope, and magnetometer. The processor computes a velocity vector 306 based on this data. In one embodiment, the processor executes the Madgwick IMU and attitude and heading reference system (AHRS) sensor fusion algorithm (https://x-io.co.uk/open-source-imu-and-ahrs-algorithms/), although other algorithms may also be used. A wind correction algorithm is then executed 308 to correct for the effect of wind on the sensor vehicle(s). Ground-fixed accelerations may be used as inputs for the wind correction algorithm. The measured flow is then output 310 for each sensor vehicle. The processing steps of FIG. 3A may be executed repeatedly at a selected time interval (e.g., at a rate of 1, 10, 100, 1000 Hz, etc.) to obtain flow measurements from each sensor vehicle over time as the sensor vehicles move through the flow field.

Figure 3B:
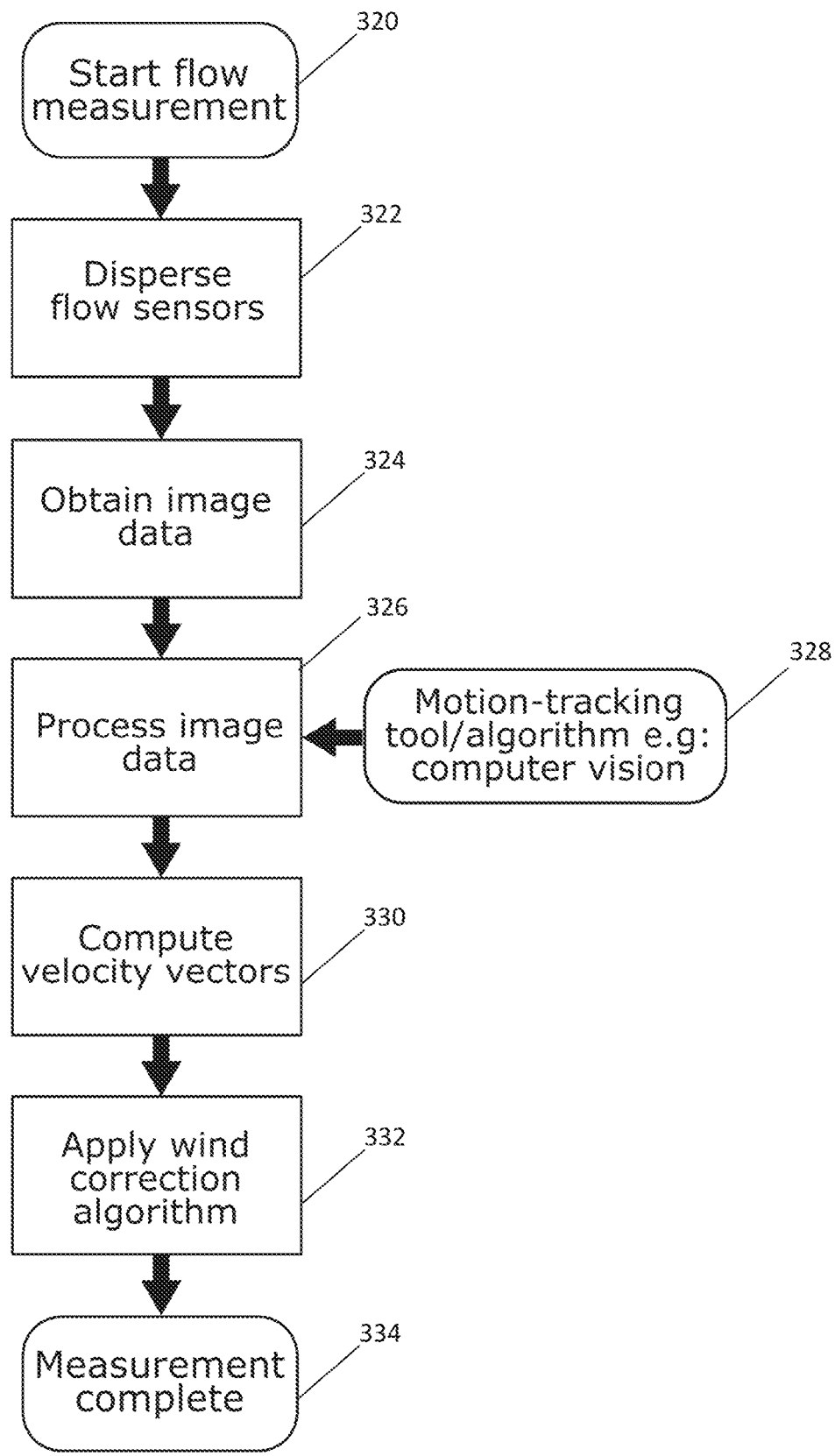
FIG. 3B is a flowchart overview of a flow-sensing process, from start to completion of a measurement, according to a generalized embodiment based on a passive sensor.

Processing passive sensor vehicle data may include the processor executing one or more algorithms, such as the embodiment shown in the flowchart of FIG. 3B. Upon dispersing one or more sensor vehicles 322, sensor vehicle image data are obtained 324 from one or more cameras. The processor analyzes the image data 326 and computes a velocity vector 330 based on the data. For example, the processor may execute a computer vision algorithm 328 to obtain motion tracking data (e.g., position, velocity, and acceleration) from the image data 324. A wind correction algorithm is then executed 332 to correct for the effect of wind on the sensor vehicle(s). Ground-fixed accelerations may be used as inputs for the wind correction algorithm. The measured flow is then output 334 for each sensor vehicle. The processing steps of FIG. 3B may be executed repeatedly at a selected time interval (e.g., at a rate of 1, 10, 100, 1000 Hz, etc.) to obtain flow measurements from each sensor vehicle over time as the sensor vehicles move through the flow field.

Figure 4A:
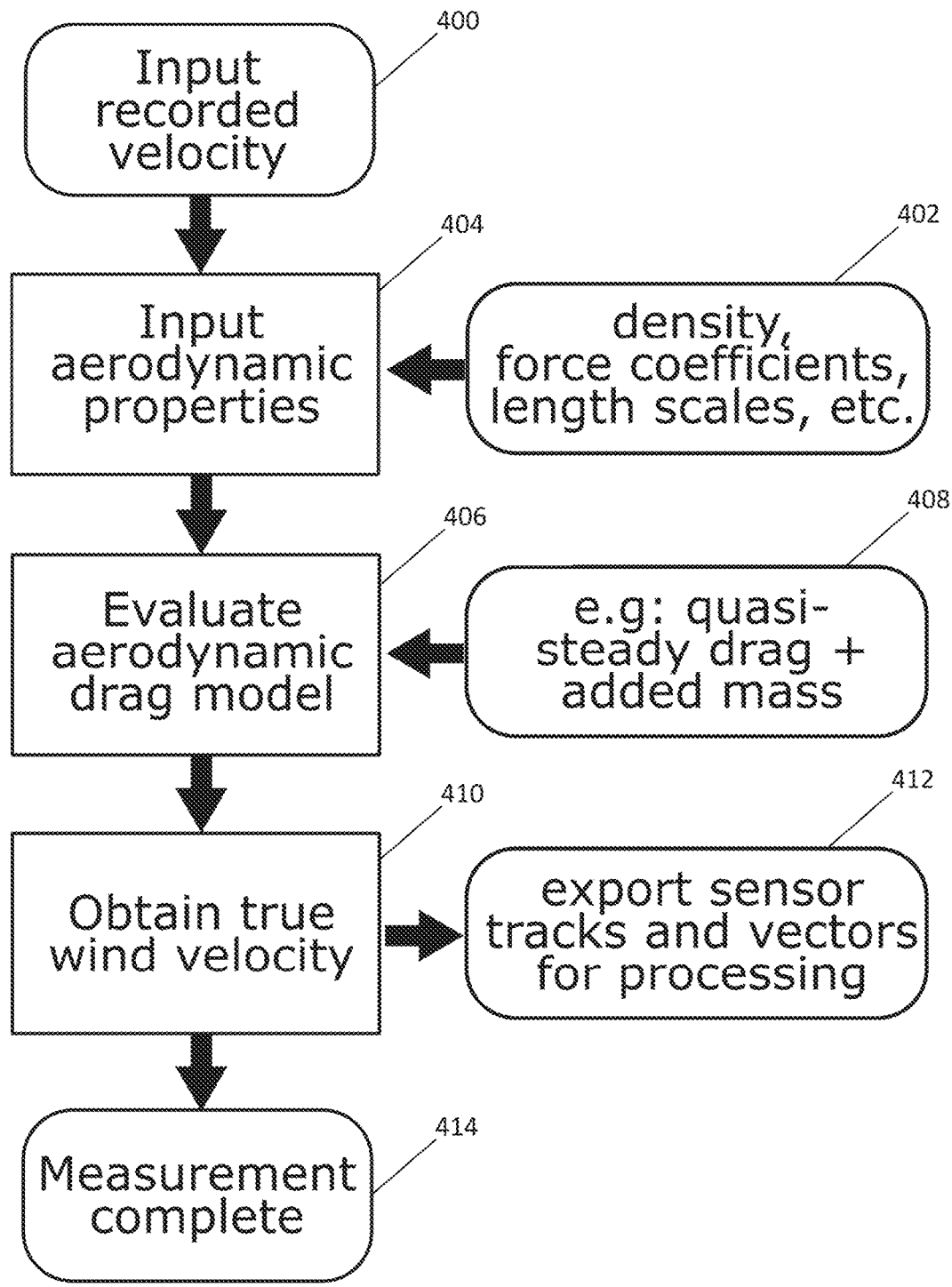
FIG. 4A is a flowchart overview of a wind-correction algorithm, according to a generalized embodiment.

FIG. 4A shows an example of a generalized wind-correction algorithm. The algorithm can of course be adapted for use with other fluids. Upon receiving the recorded or computed velocity of an active or passive sensor vehicle 400, various aerodynamic properties 404 of the sensor vehicle are inputted to a physical model, i.e., a model based upon the sensor vehicle interaction with its surrounding flow, e.g., a drag force model 406, and the model is evaluated with respect to parameters such as quasi-steady-state drag and added mass 408.

An example of a drag force model for a spherical sensor vehicle is described by the following equation:

$$F_D = 0.5 \rho_A C_D (u-U)^2 \pi R^2 + \frac{4}{3} \rho_A \pi R^3 K \frac{d(u-U)}{dt} \quad (1)$$

where $\rho_A$ is the density of air, $C_D$ is the drag coefficient of a sphere, u is the wind velocity, U is the sensor velocity, R is the radius of the sensor body and K is the added-mass coefficient for a sphere. U, and its rate of change, are measured by the sensor vehicle, allowing for u to be calculated by solving the differential equation. For other sensor vehicles (i.e., other shapes, sizes, etc.) or other fluids, an appropriate model would be used instead at 406.

Another example of a drag force model for a sphere is described by equation (2). This model is based on an energized-mass approach (Galler, J. N., et al., Application of the Energized-Mass Concept to Describe Gust-Body Interactions, AIAA Scitech 2020 Forum, 2020) which offers a robust kinetic energy based framework for modelling forces resulting from separated flow around an object (i.e., a sensor vehicle), requiring only kinematics, Reynolds number, and geometry-based inputs.

$$F_D = \frac{dm_e}{dt}(u-U) + m_e\left(\frac{du}{dt} - \frac{dU}{dt}\right) \quad (2)$$

where $m_e$ is energized mass, which is modelled by the following equation:

$$m_e = \quad (3)$$

$$\begin{cases} 2^{\frac{3}{2}} \rho \pi R^{\frac{3}{2}} \int_0^T (u-U)^{\frac{3}{2}} t^{\frac{1}{2}} Re^{-\frac{1}{4}} dt & \text{while } \frac{dm_e}{dt} < \frac{1}{2} C_d \rho \pi R^2 (u-U) \\ m_e \big|_{t=T} + \frac{1}{2} \rho \pi R^2 C_d \int_T^t (u-U) dt & \text{otherwise } t > T \end{cases}$$

where t is time, T is the time at which steady-state conditions are satisfied and Re is Reynolds number in the body-fixed frame of reference. Of course, other approaches may be used to develop a physical model for a sensor vehicle, depending on factors such as Reynolds number, Mach number, geometric shape of sensor vehicle, etc.

Returning to FIG. 4A, after the model is evaluated, the true wind velocity is obtained 410, at which point sensor tracks and vectors can be exported 412 for further processing. These steps may be repeated at the selected time interval of the processing of FIG. 3A or 3B until the measurement is complete 414.

Figure 4B:
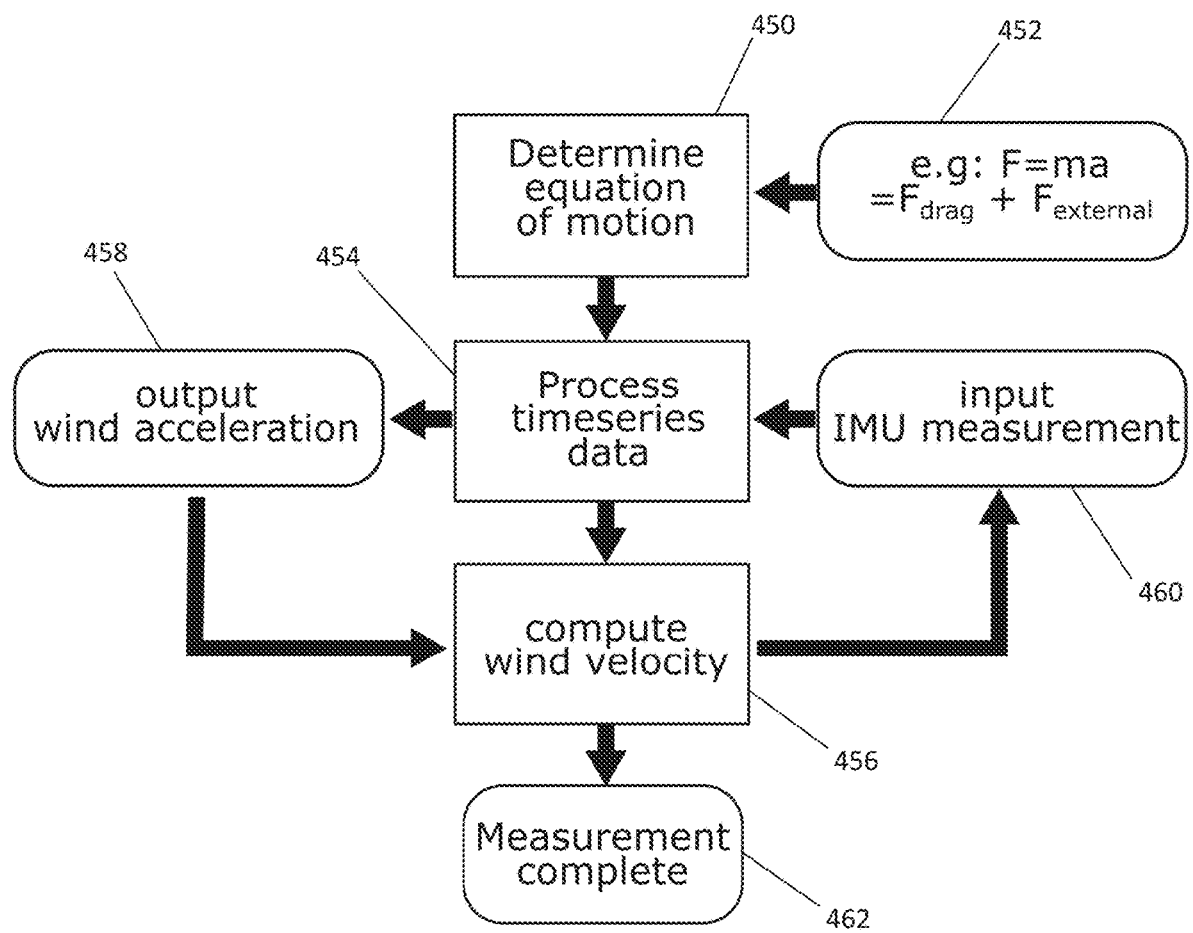
FIG. 4B is a flowchart of a model-based wind correction algorithm, according to one embodiment.

FIG. 4B shows an example of a physical model-based wind correction algorithm. Prior to a measurement, an equation of motion 450 specific to a selected sensor vehicle is determined based upon forces to be experienced by the sensor vehicle. An example of an equation of motion is shown at 452. During or post measurement, the data is processed 454 through the equation of motion to extract the unknown wind velocity 456, and, optionally, the wind acceleration is computed and outputted 458. In the case of an active sensor vehicle, processing may include using IMU data 460 received from the sensor vehicle. These steps may be repeated at the selected time interval of the processing of FIG. 3A or 3B until the measurement is complete 462.

The invention is further described by way of the following examples. It will be understood that the examples are provided for illustrative purposes, and are not to be construed as limiting the scope of the invention in any way.

Example 1

The following example describes a prototype that was built and tested to demonstrate an embodiment based on active sensor vehicles.

Figure 5:
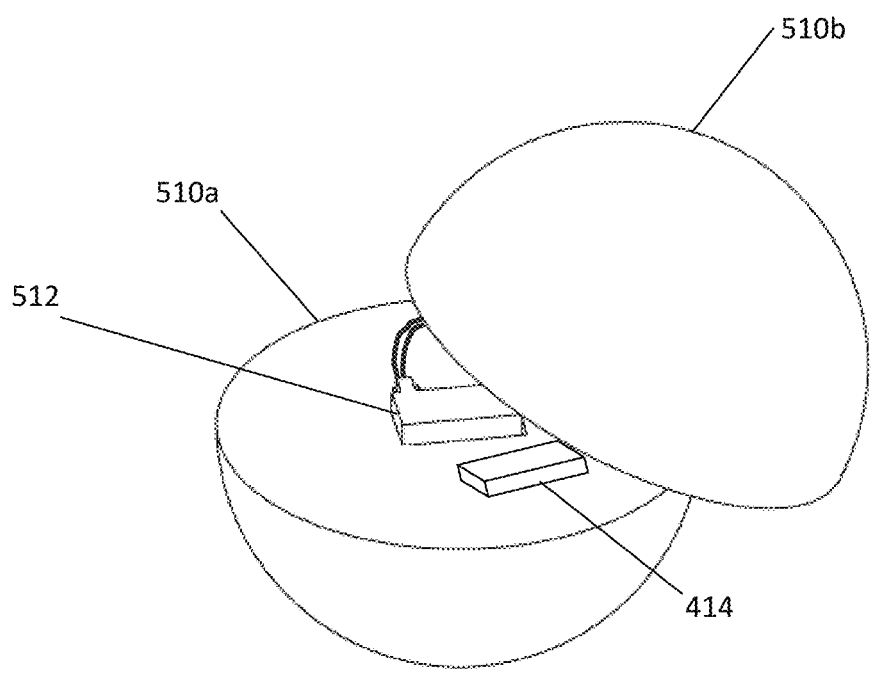
FIG. 5 is a photograph of a prototype spherical active sensor vehicle, shown opened to reveal internal hardware.

Prototype sensor vehicles were constructed from Styrofoam™ spheres. A "large" sensor vehicle was 9.5 cm in diameter and had a mass of 17 g, and a "small" sensor vehicle was 6.0 cm in diameter and had a mass of 10 g. The Styrofoam spheres were cut in half, and cavities were cut to accommodate hardware. FIG. 5 is a photograph showing one of the sensor vehicles with Styrofoam sphere halves 510a, 510b opened to reveal the internal hardware. The hardware was a printed circuit board 512, which included an IMU, data transmission circuitry and antenna, and power regulator, and a battery 514. A physical model was developed for the spherical sensor vehicles (see Equation (1)).

Figure 6:
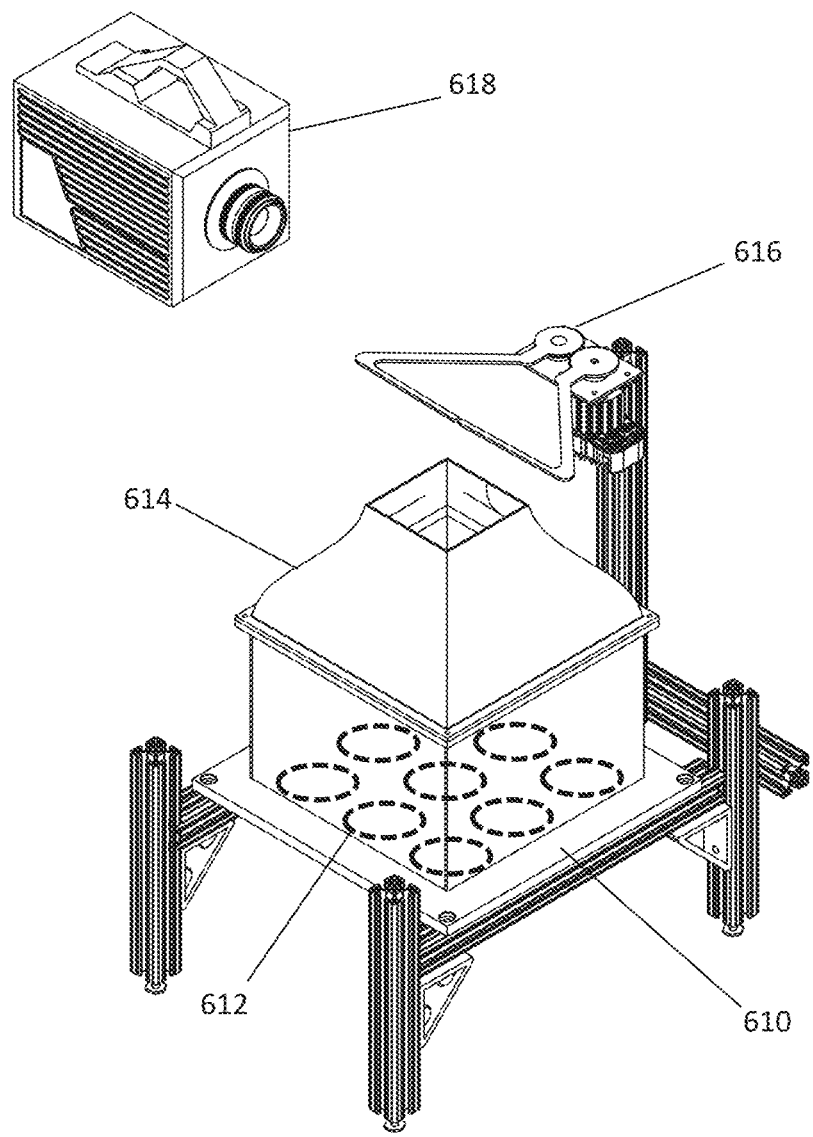
FIG. 6 is a diagram of a wind tunnel used to a test a prototype sensor vehicle.

FIG. 6 is a diagram of the wind tunnel in which prototype testing was carried out. The wind tunnel was constructed in a vertical, open-jet configuration with an unsteady capability to both mimic natural updrafts, and to reduce complexity in tracking the sensor vehicle's motion. A 3×3 array of high-power computer fans 612 in the base 610 were used for flow generation, and were capable of producing wind speeds up to 72 km/h. A single honeycomb layer (not shown) was installed above the fan array for flow straightening, and two mesh screens (not shown) were installed to reduce the turbulence intensity of the flow itself 612. A contraction 614 was designed using a Bell-Mehta curve for smooth outflow conditions and mounted above clear Plexiglass™ walls. A pulse-width-modulation based controller was designed using LabView and a National Instruments 6212-USB data acquisition (DAQ) system. A servo-based sensor vehicle release mechanism 616 was used to release the sensor vehicle into the wind tunnel and the sensor vehicle was allowed to respond freely to gusts of up to 54 km/h provided by the fan array. Sensor vehicle motion was recorded with a Photron FASTCAM SA4 high speed camera 618. The flow profile was determined using particle image velocimetry for comparison to measured results. Theatre fog was used to seed the flow, and a 3 W Nd:YAG continuous laser was used for illumination.

A base station including a radio receiver and data acquisition hardware was connected to a laptop computer. The base station communicated with the sensor vehicle to receive data, and passed the data to a processing algorithm based on FIG. 3A executed by the laptop computer. Inertial measurements provided by the sensor vehicles were received and corrected using a wind-correction algorithm based on FIG. 4A and the physical models developed for the spherical sensor vehicles, and the applied wind (gust) was calculated.

Figures 7A, 7B:
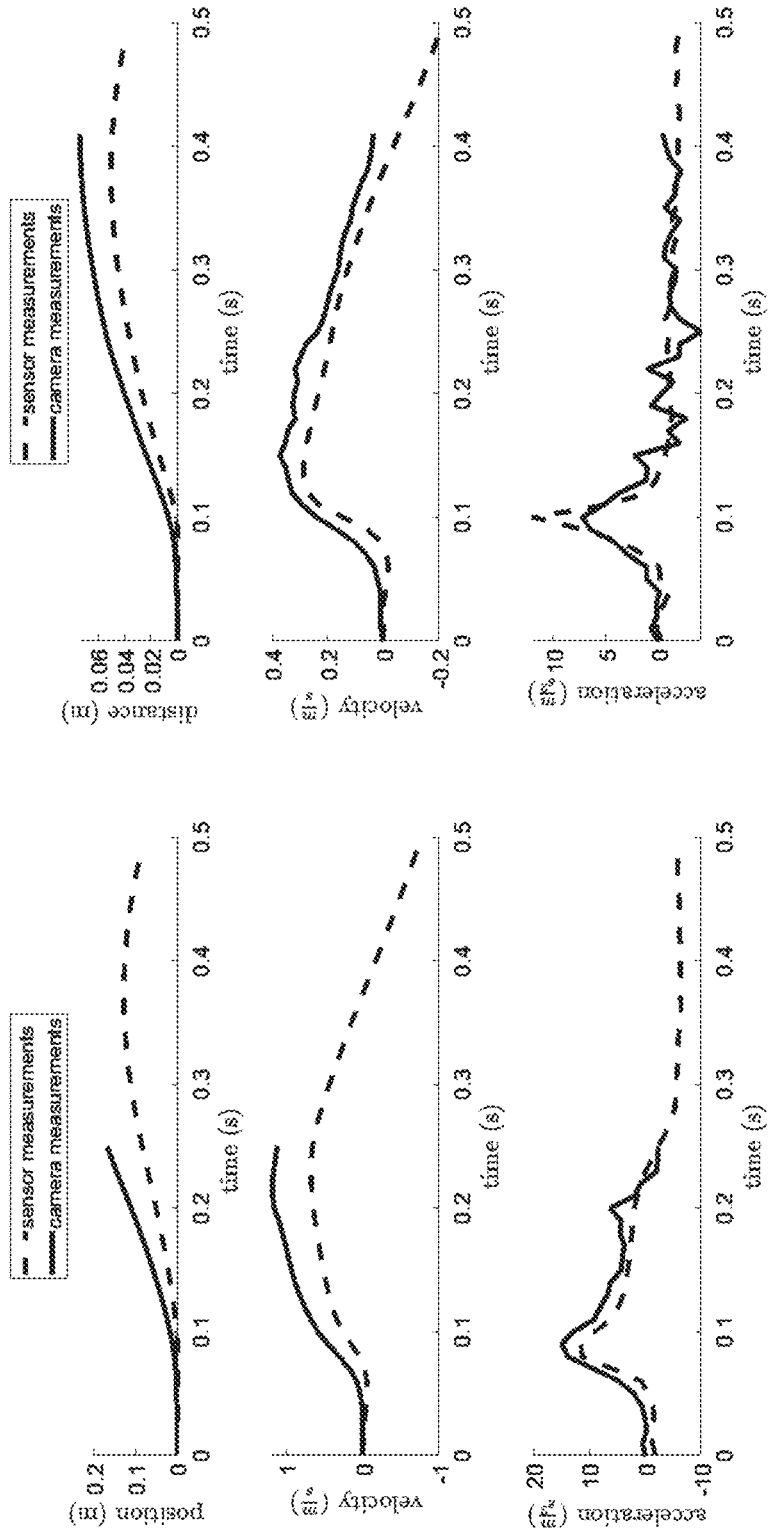
FIGS. 7A and 7B are plots of position/distance, velocity, and acceleration data obtained by processing data from large and small sensor vehicles, respectively, together with data obtained from high-speed camera images for comparison, in prototype testing and data processing based on a first physical model of the sensor vehicles.

First, a physical model was developed based on the equation of motion given above (equation (1)) and used to process the data. FIGS. 7A and 7B show plots of position/distance, velocity, and acceleration data obtained by processing data from the small and large sensor vehicles, respectively, using the developed model and algorithm, together with data obtained from the high-speed camera images, for comparison.

Figure 8A:
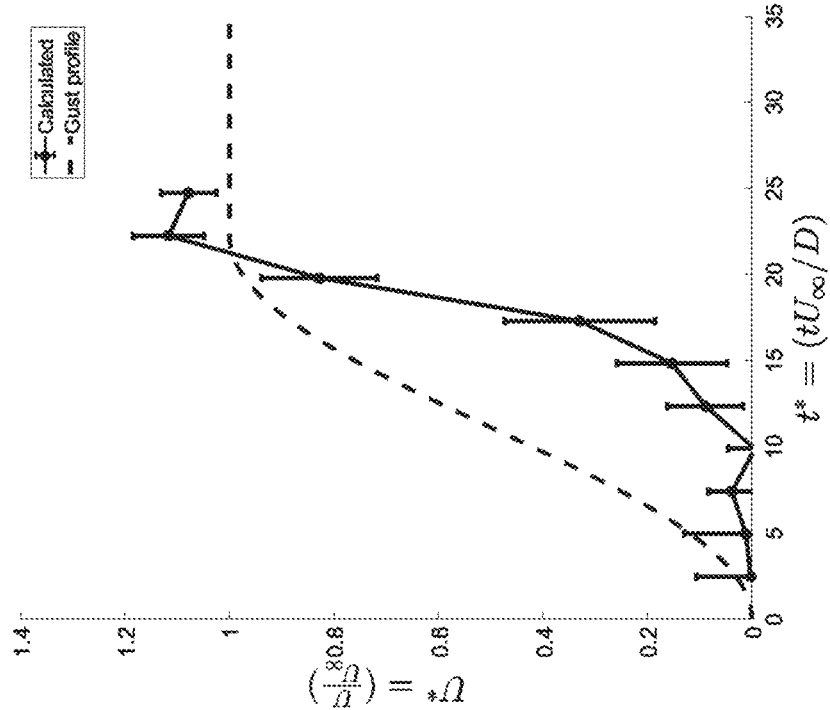
FIGS. 8A and 8B are plots of flow velocity as measured by large and small sensor vehicles, respectively, and calculated (predicted) velocity for the two sensors in the wind tunnel of FIG. 6, in prototype testing and data processing based on a first physical model of the sensor vehicles.
Figure 8B:
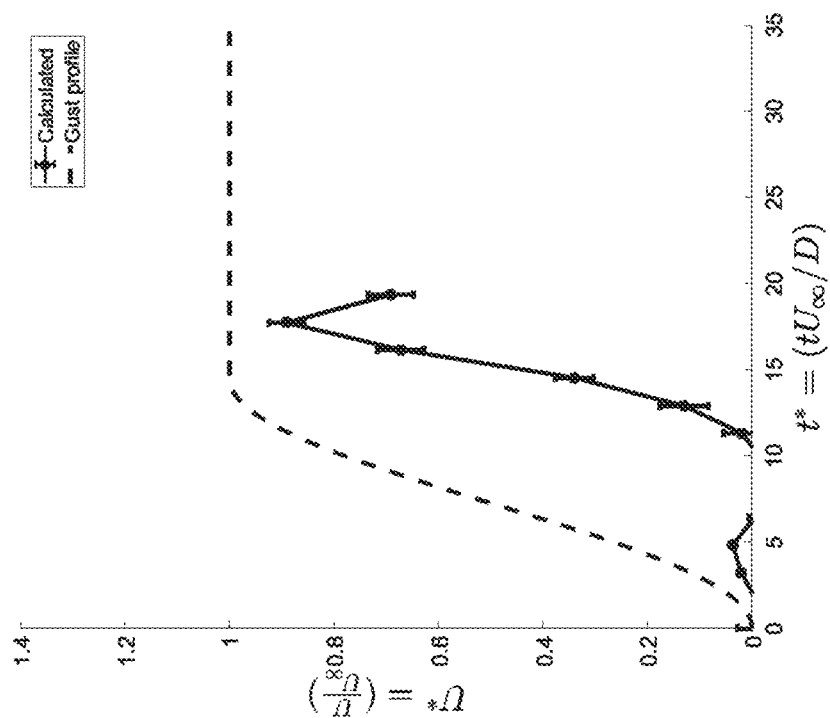

FIGS. 8A and 8B show plots of flow velocity as measured by the small and large sensor vehicles, respectively, and calculated (predicted) velocity for the two sensors in the wind tunnel. Equation (1) was used to generate the calculated plots after processing the direct outputs from the sensor vehicles. By inputting the correctly oriented velocity vectors into the variable U, the wind was calculated by stepping through the equation in time. It can be seen that both sensor vehicles capture the gust trends, however, vehicle inertia causes a time lag.

Figure 9:
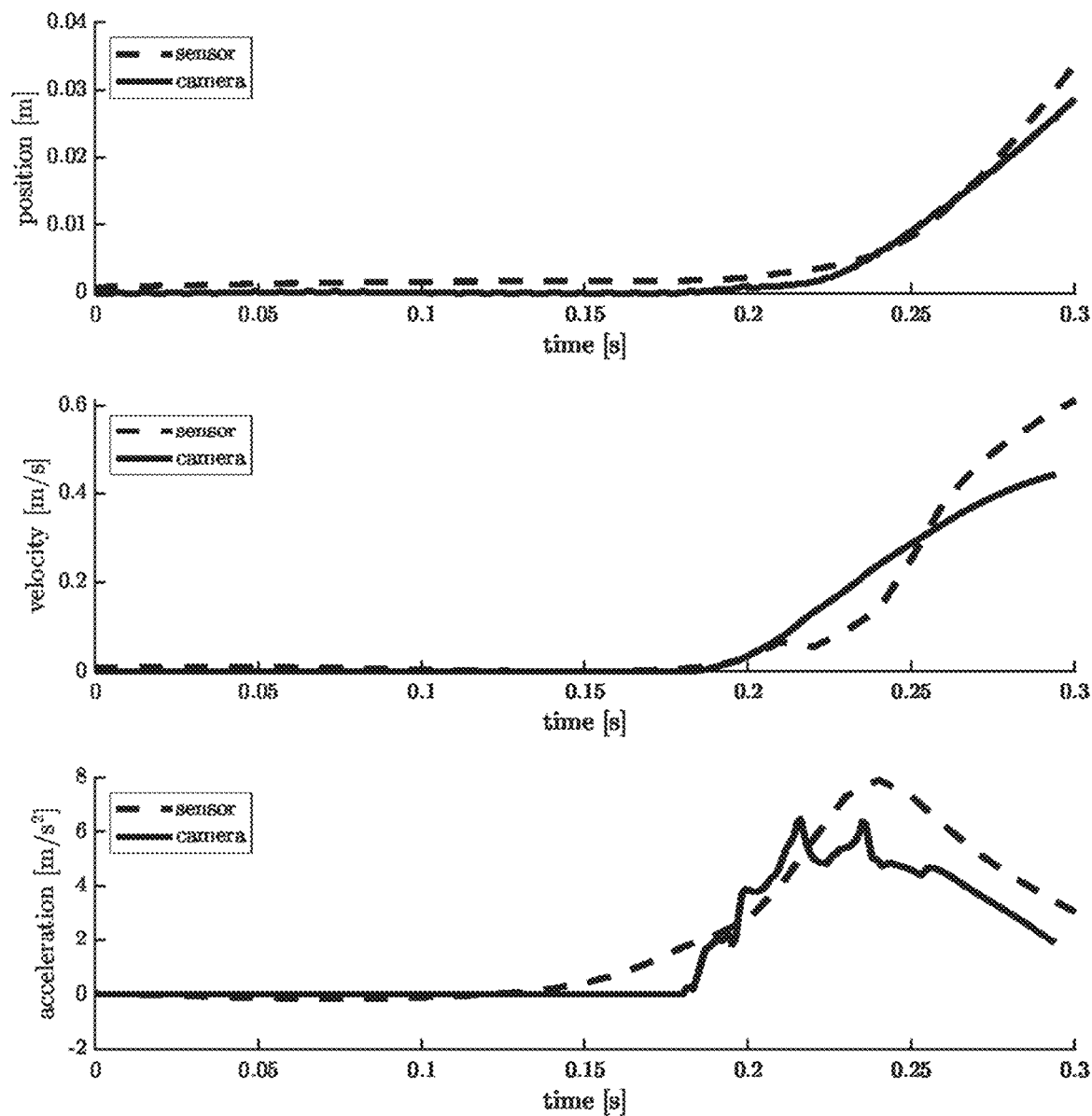
FIG. 9 shows plots of position/distance, velocity, and acceleration data obtained by processing data from the large sensor vehicle, using a second physical model, together with data obtained from high-speed camera images, for comparison.

Second, an alternative physical model (equation (2)) was developed and used to analyze data from the large sensor vehicle. FIG. 9 shows plots of position/distance, velocity, and acceleration data obtained by processing data from the large sensor vehicle, using the alternative developed model and algorithm, together with data obtained from the high-speed camera images, for comparison.

Figure 10:
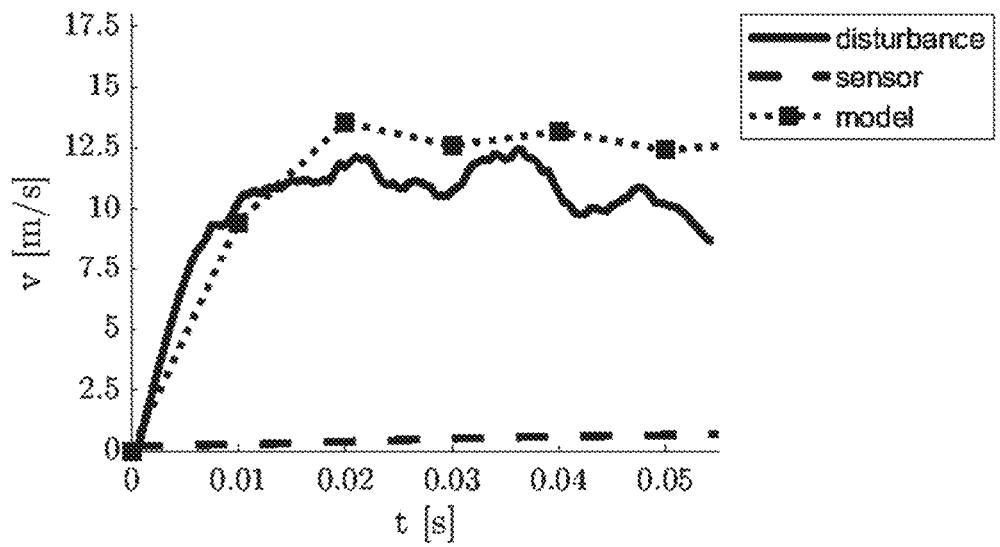
FIG. 10 is a plot of flow velocity as measured by the large spherical prototype sensor vehicle of FIG. 5 and calculated (predicted) velocity for the sensor in the wind tunnel of FIG. 6, in prototype testing and data processing based on a second physical model of the sensor vehicle.

FIG. 10 shows plots of flow velocity as measured using the large sensor vehicle, and calculated (modelled) velocity for the sensor in the wind tunnel. The solid line shows the true wind velocity measured via particle image velocimetry, the dashed line shows the velocity of the sensor vehicle, and the dotted line with square markers shows the corrected wind velocity produced by processing the sensor vehicle motion. The model was used to generate the calculated plots after processing the direct outputs from the sensor vehicle. By inputting the correctly oriented velocity vectors into the model, the wind was calculated by stepping through the equation in time. It can be seen that the sensor vehicle captures the gust trends, however, vehicle inertia causes a slight time lag.

Example 2

Figure 11:
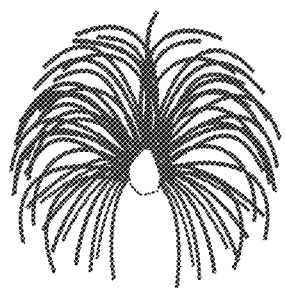
FIG. 11 is a representative drawing of a typical milkweed seed, used as an optically-tracked passive sensor vehicle.

A milkweed seed was used as a passive sensor vehicle due to its naturally high drag and relatively low mass. Passive sensor vehicles may of course be manufactured according to required/selected specifications, which may be tailored to measurement applications of interest. FIG. 11 is a representative drawing of a typical milkweed seed. The milkweed seed has many hairs sprouting from a central seed in a near-spherical pattern, providing an overall geometry that is relative straight-forward to physically model. A physical model was developed for the sensor vehicle using equation (2), assuming negligible effects of porosity and flexibility. The sensor vehicle used in this example weighed 1.93 mg and is representative of sensors that may be used for optical measurements in volumes of tens of cubic metres.

The wind tunnel of FIG. 6 was used to perform the experiments, following the same procedure as Example 1, except the high speed camera (Photron FASTCAM SA4) was used to optically record the motion of the sensor vehicle in response to a wind gust. The image data were processed on a laptop computer running an open-source Python-based computer vision algorithm (https://www.pyimagesearch.com/2015/09/14/ball-tracking-with-opencv/) which was modified to obtain motion tracking data (position, velocity, and acceleration) from the recorded sensor vehicle data.

Figure 12:
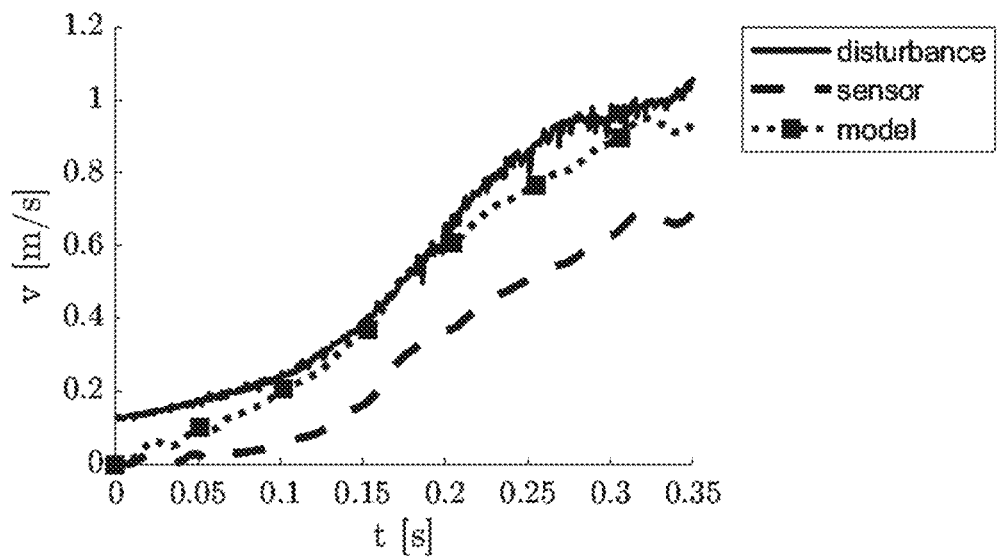
FIG. 12 is a plot of flow velocity measured using an optically tracked passive sensor vehicle in the wind tunnel of FIG. 5, and calculated (predicted) velocity for the sensor, in prototype testing.

FIG. 12 shows plots of flow velocity, sensor vehicle response, and modelled flow velocity extracted from the images recorded of the sensor vehicle, using a processing algorithm based on FIG. 3B. The solid line shows the true wind velocity measured via particle image velocimetry, the dashed line shows the velocity of the sensor vehicle and the dotted line with square markers shows the corrected wind velocity produced by processing the sensor vehicle motion. Applying a wind-correction algorithm, in this case, based on FIG. 4A, allows for the true wind velocity to be extracted from the motion image data of the sensor vehicle.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. Apparatus for measuring velocity perturbation in a fluid environment, comprising:
   one or more sensor vehicle adapted to be deployed in the fluid environment and to respond to a force exerted by the fluid environment;
   a device that obtains data comprising at least one of position and acceleration of the one or more sensor vehicle deployed in the fluid as it responds to the force exerted by the fluid environment; and
   a processor that executes an algorithm that applies a physical model including an equation of motion specific to the force acting on the one or more sensor vehicle to correct for the response of the sensor vehicle in the obtained data;
   wherein the physical model extracts a velocity field of the fluid environment from the obtained data, and outputs a corrected map of the velocity field of the fluid environment.

2. The apparatus of claim 1, wherein:
   each of the one or more sensor vehicle is an active sensor vehicle comprising an inertial measurement unit (IMU) and a global positioning system (GPS) unit;
   the device that obtains data includes a receiver that obtains IMU data and GPS data from each of the one or more sensor vehicle; and
   the processor applies the physical model of the one or more sensor vehicle to the obtained IMU and GPS data to extract the velocity field of the fluid environment.

3. The apparatus of claim 1, wherein:
   each of the one or more sensor vehicle is a passive sensor vehicle;
   the device that obtains data includes a camera that obtains image data of the one or more sensor vehicle; and
   the processor determines position, velocity, and acceleration of the one or more sensor vehicle from the image data and applies the physical model of the one or more sensor vehicle to extract the velocity field of the fluid environment from the image data.

4. The apparatus of claim 1, wherein the one or more sensor vehicle is adapted to move passively through the fluid and/or to be transported by the fluid.

5. The apparatus of claim 1, wherein the fluid is a gas.

6. The apparatus of claim 1, wherein the fluid comprises air.

7. The apparatus of claim 1, wherein the fluid is a liquid.

8. The apparatus of claim 1, wherein the fluid comprises water.

9. The apparatus of claim 1, wherein the velocity field map provides an indication of movement of particulate matter of interest in the fluid in real time.

10. The apparatus of claim 9, wherein the particulate matter comprises a chemical compound.

11. The apparatus of claim 1, wherein the one or more sensor vehicle includes one or more sensors that detect one or more substance.

12. The apparatus of claim 11, wherein the one or more sensors that detect one or more substances detect one or more of gases, pollutants, toxins, and salinity.

13. The apparatus of claim 11, wherein the apparatus tracks dispersal and/or concentration of the one or more substance in an atmospheric, aquatic, or oceanic environment.

14. A method for measuring velocity perturbation in a fluid environment, comprising:
- deploying one or more sensor vehicle in the fluid environment, wherein the one or more sensor vehicle is adapted to respond to a force exerted the fluid environment;
- obtaining data comprising at least one of position and acceleration of the one or more sensor vehicle deployed in the fluid as it responds to the force exerted by the fluid environment;
- using a processor to execute an algorithm that applies a physical model including an equation of motion specific to the force acting on the one or more sensor vehicle to correct for the response of the sensor vehicle in the obtained data;
- wherein the physical model extracts a velocity field of the fluid environment from the obtained data; and
- outputting a corrected map of the velocity field of the fluid environment.

15. The method of claim 14, comprising:
- deploying one or more active sensor vehicle comprising inertial measurement unit (IMU) and a global positioning system (GPS) unit;
- obtaining IMU data and GPS data from each of the one or more sensor vehicles;
- wherein the processor applies the physical model of the one or more sensor vehicle to extract a velocity field of the fluid environment from the IMU and GPS data.

16. The method of claim 14, comprising:
- deploying one or more passive sensor vehicle;
- using a camera to obtain image data of the one or more sensor vehicle;
- wherein the processor determines position, velocity, and acceleration of the one or more sensor vehicle from the image data and applies the physical model of the one or more sensor vehicle to extract a velocity field of the fluid environment from the image data.

17. The method of claim 14, wherein the one or more sensor vehicle is adapted to move passively through the fluid and/or to be transported by the fluid.

18. The method of claim 14, wherein the fluid is a gas.

19. The method of claim 14, wherein the fluid comprises air.

20. The method of claim 14, wherein the fluid is a liquid.

21. The method of claim 14, wherein the fluid comprises water.

22. The method of claim 14, wherein the velocity field map provides an indication of movement of particulate matter of interest in the fluid in real time.

23. The method of claim 22, wherein the particulate matter comprises a chemical compound.

* * * * *